United States Patent
Sugimoto et al.

(10) Patent No.: US 11,904,722 B2
(45) Date of Patent: Feb. 20, 2024

(54) SERVER, CHARGING SYSTEM, AND COMPUTER READABLE RECORDING MEDIUM

(71) Applicant: TOYOTA JIDOSHA KABUSHIKI KAISHA, Toyota (JP)

(72) Inventors: Kazuhiro Sugimoto, Ashigarakami-gun (JP); Kotoru Sato, Susono (JP); Kumiko Katsumata, Susono (JP); Shun Ota, Susono (JP); Takahiro Suzuki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 17/502,764

(22) Filed: Oct. 15, 2021

(65) Prior Publication Data
US 2022/0169143 A1 Jun. 2, 2022

(30) Foreign Application Priority Data
Dec. 1, 2020 (JP) ................. 2020-199735

(51) Int. Cl.
*H02J 7/00* (2006.01)
*B60L 53/68* (2019.01)
(Continued)

(52) U.S. Cl.
CPC .............. *B60L 53/68* (2019.02); *B60L 53/00* (2019.02); *B60L 53/11* (2019.02); *B60L 58/10* (2019.02);
(Continued)

(58) Field of Classification Search
CPC .......... B60L 53/00; B60L 53/11; B60L 53/68; B60L 58/10; B60L 58/12; B60L 58/18;
(Continued)

(56) References Cited

U.S. PATENT DOCUMENTS

| 8,996,213 B2 | 3/2015 | Ishikawa et al. |
| 2015/0048803 A1* | 2/2015 | Noh .................... H02J 7/00047 320/155 |

FOREIGN PATENT DOCUMENTS

| CN | 104378497 A | 2/2015 |
| JP | 2011-083165 A | 4/2011 |

(Continued)

OTHER PUBLICATIONS

Christian Cawley, "How to Turn an Android Device Into a Web Server", Mar. 19, 2019 <https://www.makeuseof.com/tag/turn-android-device-web-server/> (Year: 2019).*

*Primary Examiner* — Zixuan Zhou
(74) *Attorney, Agent, or Firm* — Finnegan, Henderson, Farabow, Garrett & Dunner, LLP

(57) ABSTRACT

A server includes a processor configured to: acquire a starting time representing a time when a user starts to use a moving object including a rechargeable secondary battery; estimate a charging completion time by which a required amount of power is charged to the moving object; determine whether or not charging of the moving object is completed by the starting time based on the starting time and the charging completion time; and switch a charging mode of charging the moving object performed by a charging device from a usual charging mode to a rapid charging mode in a case where the charging of the moving object is not completed by the starting time.

14 Claims, 7 Drawing Sheets

(51) Int. Cl.
*B60L 58/12* (2019.01)
*B60L 58/18* (2019.01)
*B60L 53/10* (2019.01)
*B60W 50/14* (2020.01)
*B60W 10/26* (2006.01)
*G01C 21/34* (2006.01)
*B60L 58/10* (2019.01)
*B60L 53/00* (2019.01)

(52) U.S. Cl.
CPC ............... *B60L 58/12* (2019.02); *B60L 58/18* (2019.02); *B60W 10/26* (2013.01); *B60W 50/14* (2013.01); *G01C 21/3407* (2013.01); *B60W 2510/244* (2013.01)

(58) Field of Classification Search
CPC ................. B60W 10/26; B60W 50/14; B60W 2510/244; G01C 21/3407
USPC ............................................ 320/109; 701/22
See application file for complete search history.

(56) References Cited

FOREIGN PATENT DOCUMENTS

| JP | 2013-070515 A | 4/2013 |
|----|---------------|--------|
| JP | 2013-150428 A | 8/2013 |
| JP | 2014-011849 A | 1/2014 |
| JP | 5511924 B | 6/2014 |
| WO | WO 2013/035481 A1 | 3/2013 |
| WO | WO 2015/178158 A1 | 11/2015 |

* cited by examiner

SERVER, CHARGING SYSTEM, AND COMPUTER READABLE RECORDING MEDIUM

The present application claims priority to and incorporates by reference the entire contents of Japanese Patent Application No. 2020-199735 filed in Japan on Dec. 1, 2020.

BACKGROUND

The present disclosure relates to a server, a charging system, and a computer readable recording medium.

There has been known a technique of estimating an amount of power required for arriving at a destination designated by a user based on travel history data and a scheduled travel route to the destination and controlling charging of a battery of an electric vehicle based on the required power amount. The travel history data includes types of a large number of electric vehicles, travel routes where the electric vehicles actually travel, and amounts of power consumption in the travel routes.

SUMMARY

In the known technique, a moving object such as an electric vehicle is charged by an AC-type usual charging device, so that the moving object may fail to be charged by a starting time when a user uses the moving object.

There is a need for a server, a charging system, and a computer readable recording medium that are able to perform charging by a starting time when a user starts to use a moving object.

According to one aspect of the present disclosure, there is provided a server including a processor configured to: acquire a starting time representing a time when a user starts to use a moving object including a rechargeable secondary battery; estimate a charging completion time by which a required amount of power is charged to the moving object; determine whether or not charging of the moving object is completed by the starting time based on the starting time and the charging completion time; and switch a charging mode of charging the moving object performed by a charging device from a usual charging mode to a rapid charging mode in a case where the charging of the moving object is not completed by the starting time.

DETAILED DESCRIPTION

Hereinafter, a charging system according to an embodiment of the present disclosure will be described with reference to the drawings. Note that the present disclosure is not limited by the following embodiments. Furthermore, in the following description, the same sign is attached to the same part.

Figure 1:
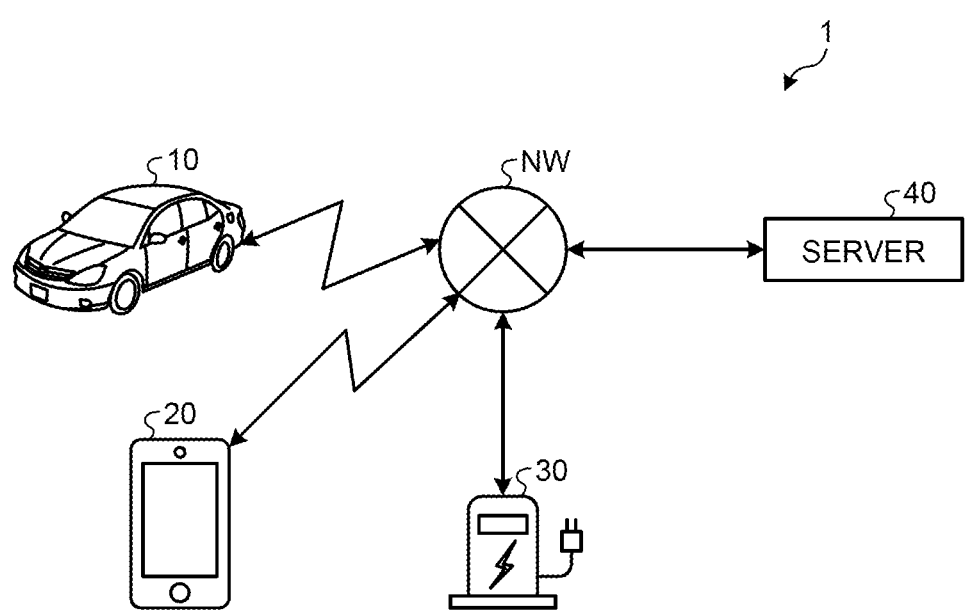
FIG. 1 schematically illustrates the configuration of a charging system according to a first embodiment.

FIG. 1 schematically illustrates the configuration of a charging system according to a first embodiment. A charging system 1 in FIG. 1 includes a moving object 10, a communication terminal 20, a charging device 30, and a server 40. The charging system 1 may communicate with each other over a network NW. The network NW includes, for example, the Internet and a mobile phone network.

Figure 2:
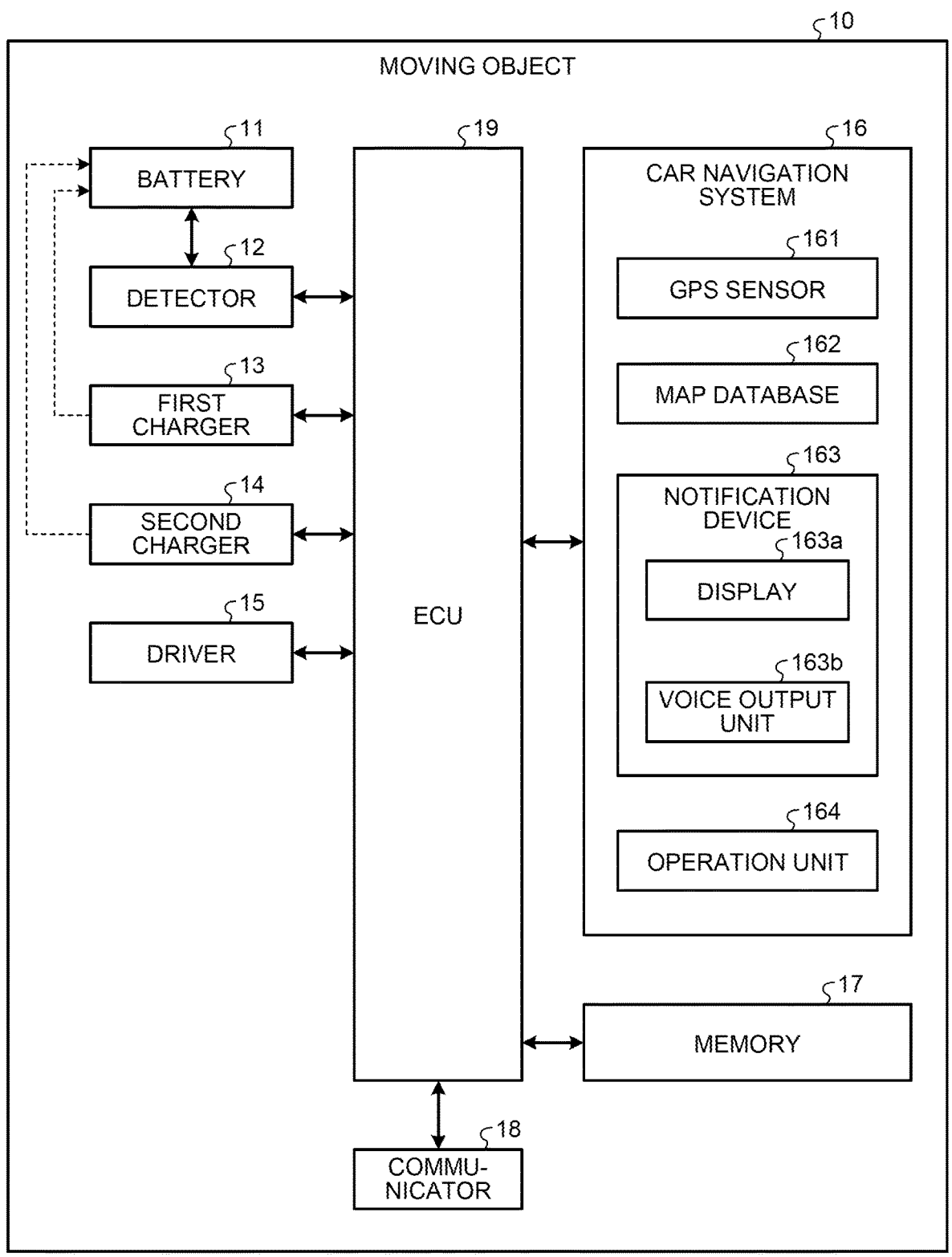
FIG. 2 is a block diagram illustrating the functional configuration of a moving object according to the first embodiment.

First, the functional configuration of the moving object 10 will be described. FIG. 2 is a block diagram illustrating the functional configuration of the moving object 10.

The moving object 10 in FIG. 2 includes a battery 11, a detector 12, a first charger 13, a second charger 14, a driver 15, a car navigation system 16, a memory 17, a communicator 18, and an electronic control unit (ECU) 19. Furthermore, although an automobile such as a battery electric vehicle (BEV), a plug-in hybrid electric vehicle (PHEV), and a fuel cell electric vehicle (FCEV) will be described as the moving object 10 below, these are not limitations. For example, an electric bicycle such as a motorcycle, a bicycle, and a scooter including a motor and a battery, a tricycle, a bus, a truck, a ship, and a drone may also be applied. Moreover, the moving object 10 may automatically move toward a destination under the control of the server 40 or the ECU 19. Of course, the moving object 10 may move toward the destination desired by a user who uses or boards the moving object 10 by the user operating a steering and the like.

The battery 11 includes a rechargeable secondary battery such as a nickel-hydrogen battery and a lithium-ion battery. The battery 11 stores high-voltage direct-current power for driving the moving object 10.

The detector 12 detects each of the state of charge (SCC), the temperature, the state of health (SOH), the voltage value, and the current value of the battery 11, and outputs the detection result to the ECU 19. The detector 12 includes various battery sensors, temperature sensors, and the like.

The first charger 13 is electrically connected to the battery 11, and may be electrically connected to the charging device 30 via a charging port. The first charger 13 converts (transforms) external power (direct-current power) supplied from the charging device 30 into voltage and power that may be charged to the battery 11, and outputs the converted voltage and power (power supply in usual charging mode). The first charger 13 includes an AC/DC converter, a DC/DC converter, and the like.

The second charger 14 is electrically connected to the battery 11, and may be electrically connected to the charging device 30 via a charging port. The second charger 14 converts (transforms) direct current supplied from the charging device 30 (power supply in rapid charging mode using DC charging) into voltage and power that may be charged to the battery 11, and outputs the converted voltage and power. The first charger 13 includes a DC/DC converter, a rectifier circuit, and the like.

The driver 15 supplies driving force to a driving wheel of the moving object 10 based on the power supplied from the battery 11 under the control of the ECU 19. The driver 15 includes a motor and the like.

The car navigation system 16 includes a global positioning system (GPS) sensor 161, a map database 162, a notification device 163, and an operation unit 164.

The GPS sensor 161 receives a signal from a plurality of GPS satellites or transmission antennas, and calculates the position (longitude and latitude) of the moving object 10 based on the received signal. The GPS sensor 161 includes a GPS reception sensor and the like. Note that, in the first embodiment, the orientation accuracy of the moving object 10 may be improved by mounting a plurality of GPS sensors 161.

The map database 162 stores various pieces of map data. The map database 162 includes a recording medium such as a hard disk drive (HDD) and a solid state drive (SSD).

The notification device 163 includes a display 163a and a voice output unit 163b. The display 163a displays an image, a map, a video, and character information. The voice output unit 163b generates sound such as voice and warning sound. The display 163a includes a display device using a liquid crystal, organic electro luminescence (EL), and the like. The voice output unit 163b includes a speaker and the like.

The operation unit 164 receives inputs of user operations, and outputs signals in accordance with the received various operation contents to the ECU 19. The operation unit 164 includes a touch panel, a button, a switch, a jog dial, and the like.

The car navigation system 16 configured as described above superimposes the current position of the moving object 10 acquired by the GPS sensor 161 on a map corresponding to map data stored in the map database 162, thereby notifying the user of information including a road on which the moving object 10 is currently traveling, a route to a destination, and the like with the display 163a and the voice output unit 163b.

The memory 17 stores various pieces of information on the moving object 10. The memory 17 stores CAN data on the moving object 10 input from the ECU 19, various programs executed by the ECU 19, and the like. The memory 17 includes a dynamic random access memory (DRAM), a read only memory (ROM), a flash memory, a hard disk drive (HDD), a solid state drive (SSD), and the like.

The communicator 18 transmits CAN data and the like to the server 40 over the network NW under the control of the ECU 19. Here, the CAN data includes the state of charge (SOC), the SOH, and the like of the battery 11. The communicator 18 includes a communication module or the like capable of transmitting/receiving various pieces of information.

The ECU 19 includes a memory and a processor having hardware such as a central processing unit (CPU). The ECU 19 controls each unit of the moving object 10. The ECU 19 moves the moving object 10 to the charging device 30 or a predetermined place by controlling the driver 15 in accordance with a signal and an instruction transmitted from the server 40 via the communicator 18, the position of the moving object 10 detected by the car navigation system 16, and the like.

Figure 3:
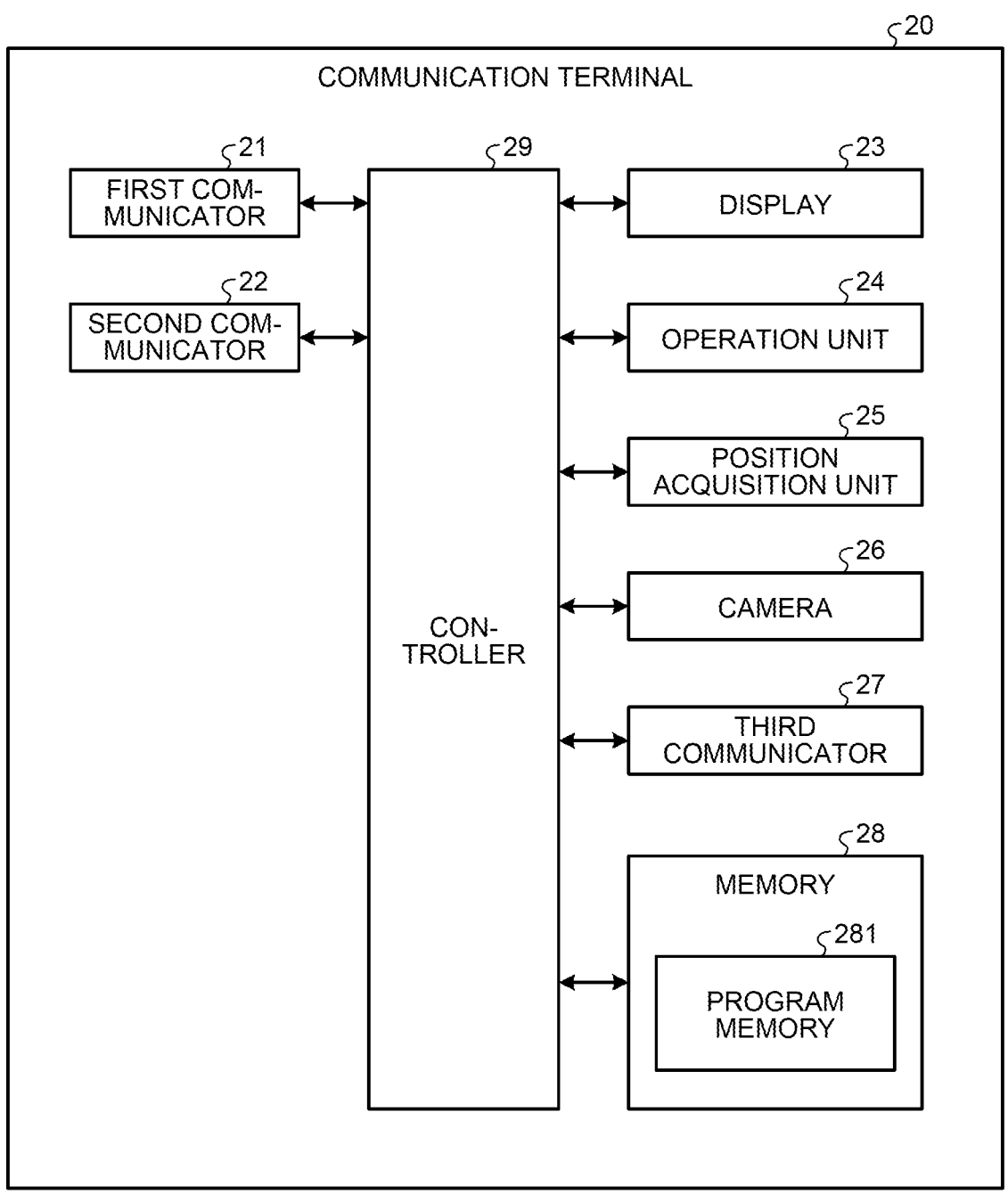
FIG. 3 is a block diagram illustrating the functional configuration of a communication terminal according to the first embodiment.

Next, the functional configuration of the communication terminal 20 will be described. FIG. 3 is a block diagram illustrating the functional configuration of the communication terminal 20.

The communication terminal 20 in FIG. 3 includes a first communicator 21, a second communicator 22, a display 23, an operation unit 24, a position acquisition unit 25, a camera 26, a third communicator 27, a memory 28, and a controller 29. Note that, although the communication terminal 20 will be described below as a mobile phone, the communication terminal 20 is not limited to the mobile phone. For example, a tablet terminal, a wearable device, and the like may be applied. Here, examples of the wearable device include a watch, an activity meter, and the like including a sensor, a communication module, and the like. The sensor may detect biological information on a user who wears the wearable device. The communication module may communicate with the outside. Furthermore, the biological information includes a body weight, a blood pressure, a pulse, a blood glucose level, a cholesterol level, a blood oxygen concentration, a body temperature, and the like.

The first communicator 21 receives various pieces of information from the moving object 10 or the wearable device under the control of the controller 29, and outputs the received various pieces of information to the controller 29. The first communicator 21 includes a communication module capable of performing, for example, Bluetooth (registered trademark) and the like.

The second communicator 22 receives various pieces of information from the moving object 10 or the wearable device under the control of the controller 29, and outputs the received various pieces of information to the controller 29. The second communicator 22 includes a communication module capable of performing Wi-Fi (registered trademark) and the like.

The display 23 displays various pieces of information under the control of the controller 29. The display 23 includes a display panel using a liquid crystal, organic electro luminescence (EL), and the like.

The operation unit 24 receives inputs of various user operations, and outputs signals corresponding to the received various operations to the controller 29. The operation unit 24 includes a touch panel, a switch, a button, and the like.

The position acquisition unit 25 acquires the position of the communication terminal 20, and outputs the acquired position to the controller 29. The position acquisition unit 25 is implemented by using a plurality of GPS reception sensors and the like.

The camera 26 generates image data by imaging a subject under the control of the controller 29, and outputs the image data to the controller 29. The camera 26 is implemented by using one or a plurality of optical systems and an image sensor of a charge coupled device (CCD) or a complementary metal oxide semiconductor (CMOS), which generate image data by capturing a subject image formed by the optical systems.

The third communicator 27 communicates with the server 40 via the network NW under the control of the controller 29, and transmits destination information on a destination set by a user via the operation unit 24. The third communicator 27 includes a communication module capable of performing a communication standard based on a mobile phone line, for example, a fourth-generation mobile communication system (4G), a fifth-generation mobile communication system (5G), and the like.

The memory 28 stores various pieces of information on the communication terminal 20 and various programs executed by the communication terminal 20. The memory 28 is implemented by using a DRAM, a ROM, a flash memory, an SSD, a memory card, and the like.

The controller 29 includes a memory and a processor having hardware such as a CPU. The controller 29 controls each unit of the communication terminal 20.

Functional Configuration of Charging Device

Figure 4:
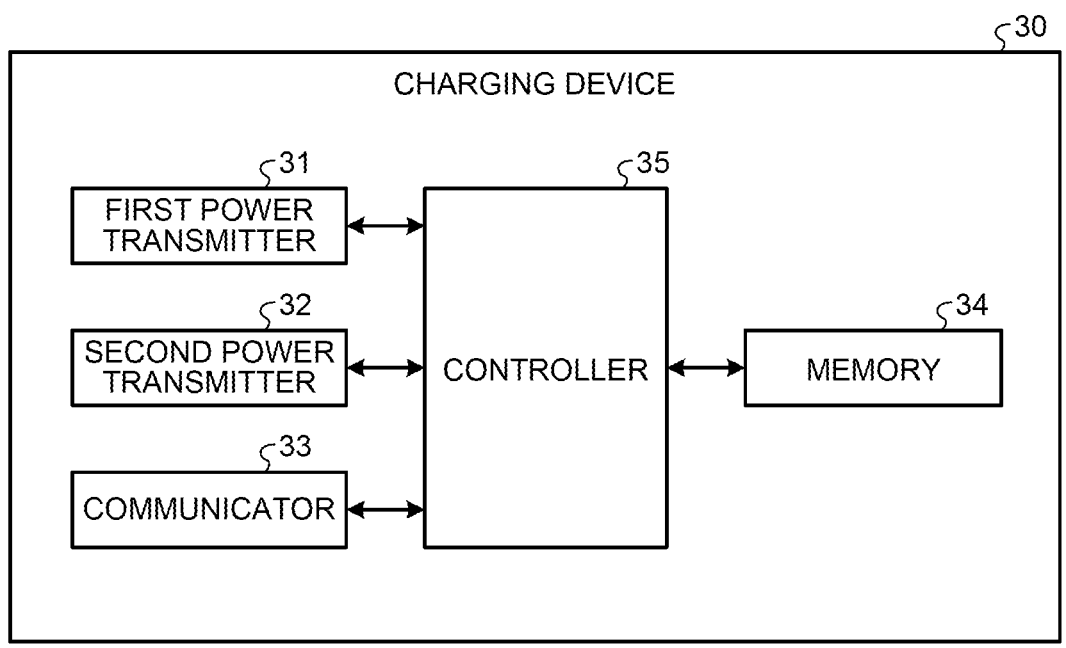
FIG. 4 is a block diagram illustrating the functional configuration of a charging device according to the first embodiment.

Next, the functional configuration of the charging device 30 will be described. FIG. 4 is a block diagram illustrating the functional configuration of the charging device 30.

The charging device 30 in FIG. 4 includes a first power transmitter 31, a second power transmitter 32, a communicator 33, a memory 34, and a controller 35.

The first charger 13 of the moving object 10 is connected to the first power transmitter 31. The first power transmitter 31 converts alternating current of a predetermined voltage value (e.g., 6600 V) supplied from an external alternating current power source into direct current of a predetermined value (e.g., 200 V), and thereby supplies the converted current to the first charger 13 (usual charging). The first power transmitter 31 includes a connector connectable to the first charger 13 of the moving object 10, a cable that transfers power to the connector, an AC/DC converter, an inverter, a rectifier circuit, a transformer, a circuit breaker, and the like. Note that the first power transmitter 31 may supply power in a non-contact manner (wireless AC charging). In the case, either of a magnetic field coupling method or an electric field coupling method may be adopted as a power supply method.

The second power transmitter 32 converts alternating current of a predetermined voltage value (e.g., 6600 V) supplied from an external alternating current power source into direct current of a predetermined voltage value (e.g., 500 V), and thereby supplies the converted current to the second charger (rapid charging mode). The second power transmitter 32 includes a connector connectable to the second charger 14 of the moving object 10, a cable that transfers power to the connector, an AC/DC converter, an inverter, a rectifier circuit, a transformer, a circuit breaker, and the like.

The communicator 33 communicates with the moving object 10, the communication terminal 20, and the server 40 over the network NW, and transmits/receives various pieces of information under the control of the controller 35. The communicator 33 includes a communication module and the like.

The memory 34 stores various pieces of information on the charging device 30. The memory 34 includes a DRAM, a ROM, a flash memory, an SSD, and the like.

The controller 35 includes a memory and a processor having hardware such as a CPU. The controller 35 controls each unit of the charging device 30.

Figure 5:
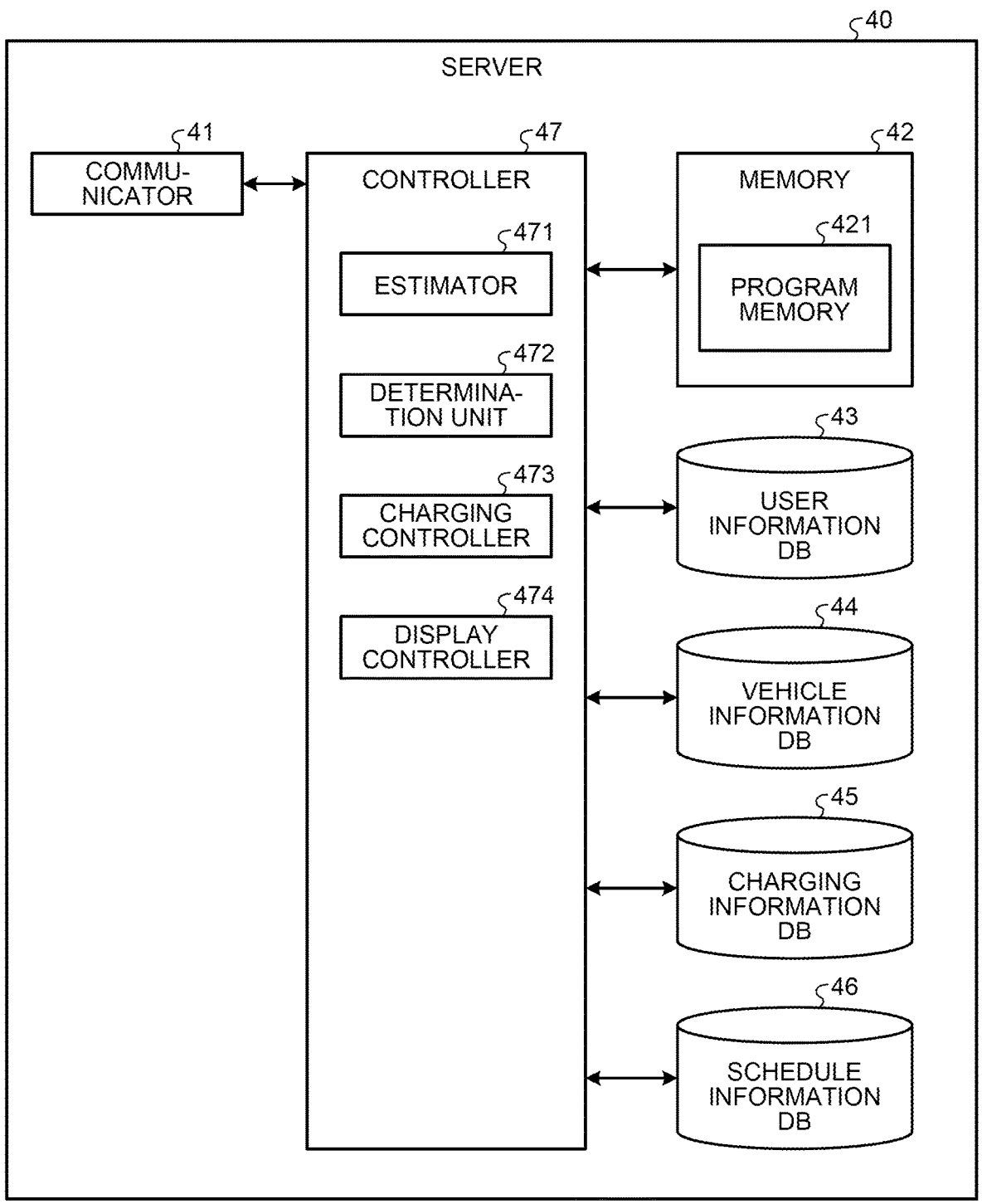
FIG. 5 is a block diagram illustrating the functional configuration of a server according to the first embodiment.

Next, the functional configuration of the server 40 will be described. FIG. 5 is a block diagram illustrating the functional configuration of the server 40.

The server 40 in FIG. 5 includes a communicator 41, a memory 42, a user information database 43 (hereinafter, referred to as "user information DB 43"), a vehicle information database 44 (hereinafter, referred to as "vehicle information DB 44"), a charging information database 45 (hereinafter, referred to as "charging information DB 45"), a schedule information database 46 (hereinafter, referred to as "schedule information DB 46"), and a controller 47.

The communicator 41 communicates with the moving object 10, the communication terminal 20, and the charging device 30 via the network NW under the control of the controller 47. The communicator 41 includes a communication module and the like.

The memory 42 stores various pieces of information on the server 40. Furthermore, the memory 42 includes a program memory 421 that stores various programs executed by the server 40. The memory 42 is implemented by using a DRAM, a ROM, a flash memory, an SSD, an HDD, a memory card, and the like.

The user information DB 43 stores user information. In the user information, terminal information for identifying the communication terminal 20 held by the user and user identification information for identifying the user are associated with each other. Here, the terminal information includes a device address, a telephone number, an e-mail address, and the like. Furthermore, the user identification information includes a name, an address, a birth date of a user, and an action history of the user based on information on the position of the communication terminal 20 of the user, and the like. Note that the action history may include a purchase history and the like of the user based on electronic money registered in the communication terminal 20 of the user. The user information DB 43 includes an HDD, an SSD, and the like.

The vehicle information DB 44 stores vehicle information. In the vehicle information, vehicle identification information for identifying the moving object 10, information on the current state of the moving object 10, and information on the current position of the moving object 10 are associated with each other. The vehicle identification information includes the vehicle type name, the model year, the owner, and the like of the moving object 10. Furthermore, the state information includes the state of charge of the battery 11 of the moving object 10, CAN data, and the like. The vehicle information DB 44 includes an HDD, an SSD, and the like.

The charging information DB 45 stores charging information. In the charging information, charging identification information for identifying the charging device 30, charging status information indicating the current charging status of the charging device 30, and installation information indicating an installation place of the charging device 30 are associated with each other. The charging identification information includes a charging mode (e.g., usual charging mode (single-phase AC 200 V or 100 V) or rapid charging mode) the charging device 30, the shape of a charging connector, a device address, and the like. The charging status information includes whether or not the moving object 10 is currently charged by the charging device 30, the scheduled completion time of charging of the battery 11 of the moving object 10, the charging status of the battery of the moving object 10, and the like. The charging information DB 45 includes an HDD, an SSD, and the like.

The schedule information DB 46 stores user schedule information. In the user schedule information, terminal information for identifying the communication terminal 20 held by a user, user identification information for identifying the user, and a schedule of the user input by the user are associated with each other. Here, the schedule of the user includes a starting position of the moving object 10, a destination of the user, a starting time of the user, a date and time when the user uses the moving object 10, vehicle identification information on the moving object 10 used by the user, the presence or absence of a going out schedule of the user, and the like. Here, the starting position is a place where each charging device 30 is installed. The schedule information DB 46 includes an HDD, an SSD, and the like.

The controller 47 includes a memory and a processor having hardware such as a CPU, a field-programmable gate array (FPGA), and a graphics processing unit (GPU). The controller 47 controls each unit of the server 40. The controller 47 includes an estimator 471, a determination unit 472, a charging controller 473, and a display controller 474. Note that, in the first embodiment, the controller 47 functions as a processor.

The estimator 471 acquires the starting time, the starting position, the destination, and the current position of the moving object 10 of the user. Specifically, the estimator 471 acquires the starting time, the starting position, and the destination of the moving object 10 set by the user operating the communication terminal 20 via the communicator 41, and acquires position information acquired by the position acquisition unit 25 of the communication terminal 20 as a current time position of the user. Of course, the estimator 471 may acquire the starting time, the starting position, and the destination of the moving object 10 of the user by acquiring schedule information corresponding to the user from the schedule information DB 46. Note that the estimator 471 may acquire the destination set by the user in the car navigation system 16 of the moving object 10 via the communicator 41. Furthermore, the estimator 471 acquires the state of charge of the battery 11 of the moving object 10 scheduled to be used by the user. Moreover, the estimator 471 estimates the charging completion time of the moving object 10 scheduled to be used by the user. Specifically, the estimator 471 estimates the charging completion time of the moving object 10 based on the state of charge of the battery 11 of the moving object 10 and the distance from the starting position of the user to the destination. In the case, the estimator 471 reads the learned model stored in the program memory 421, inputs the state of charge of the battery 11 of the moving object 10 and the distance from the starting position of the user to the destination as input data to the read learned model, outputs a charging completion time period as output data, and estimates the charging completion time by using the current time to the charging completion time period. Furthermore, the estimator 471 estimates an arrival time from the current position of the user to the starting position. Specifically, the estimator 471 estimates the arrival time from the current position of the user to the starting position by dividing the distance from the current position of the user to the starting position by a predetermined speed (e.g., 80 m/min). Moreover, the estimator 471 estimates an other person arrival time when the other person arrives at the starting position of the moving object 10. Specifically, the estimator 471 estimates the other person arrival time when the other person arrives at the starting position of the moving object 10 based on at least one of message data and voice data included in contact information input from the communication terminal 20 of the other person described later to the communication terminal 20 of the user. For example, the estimator 471 estimates the current position of the other person based on the time, content, position, and the like described in the message data included in the contact information, and estimates the other person arrival time when the other person arrives at the starting position based on the estimation result and the starting position. Note that the learned model is formed by using a deep neural network (DNN) as machine learning, for example. Furthermore, any type of network of DNN may be adopted as long as the estimator 471 may use the type. Specifically, the type of machine learning is not particularly limited. For example, it is sufficient if a type of machine learning is adopted. In the type, teacher data and learning data are provided. In the data, the state of charge of the battery 11 of the moving object 10 and a distance are associated. Learning is performed by inputting the teacher data and the learning data to a calculation model based on a multilayer neural network. Moreover, a method based on a DNN of a multilayer neural network such as a convolutional neural network (CNN) and a 3D-CNN may be used as a method of machine learning.

The determination unit 472 determines whether or not the charging of the moving object 10 has been completed by the starting time of the user based on the starting time acquired by the estimator 471 and the charging completion time estimated by the estimator 471. Furthermore, the determination unit 472 determines whether or not the user has changed the starting position of the moving object 10. Moreover, the determination unit 472 determines whether or not the user has changed the starting time of the moving object 10. Moreover, the determination unit 472 determines whether or not the contact information has been input from the other person associated with the user to the user. Here, the contact information includes at least one of message data (text data) and voice data in social networking service (SNS) and the like from the other person. Specifically, the determination unit 472 determines whether or not the contact information has been input from the communication terminal 20 of the other person associated with the user to the communication terminal 20 of the user. Furthermore, the determination unit 472 determines whether or not the other person arrives at the starting position before the starting time based on the arrival time, when the other person arrives at the starting position, estimated by the estimator 471. Furthermore, the determination unit 472 determines whether or not the user arrives at the starting position before the starting time based on the arrival time and the current position of the user. Specifically, the user may arrive at the starting position before the starting time, and the moving object 10 has been preferably charged. For that reason, the determination unit 472 determines whether or not the distance between the current position of the user and the starting position is shortened. The current position of the user is based on the position information acquired by the position acquisition unit 25 of the communication terminal 20 owned by the user.

When the determination unit 472 determines that the charging of the moving object 10 has not been completed by the starting time of the user, the charging controller 473 switches the charging mode of charging the moving object 10 with the charging device 30 from the normal charging mode to the rapid charging mode. Specifically, the charging controller 473 controls the controller 35 of the charging device 30 via the communicator 41 to switch the charging mode from the usual charging mode performed by the first power transmitter 31 to the rapid charging mode performed by the second power transmitter 32. Furthermore, when the determination unit 472 determines that the charging of the moving object 10 has been completed by the starting time of the user, the charging controller 473 maintains the charging mode of charging the moving object 10 with the charging device 30 at charging by the usual charging mode.

The display controller 474 outputs information indicating that the charging mode of charging the moving object 10 with the charging device 30 has been switched to the rapid charging mode and a charging completion time to the communication terminal 20 of the user via the communicator 41.

Figure 6:
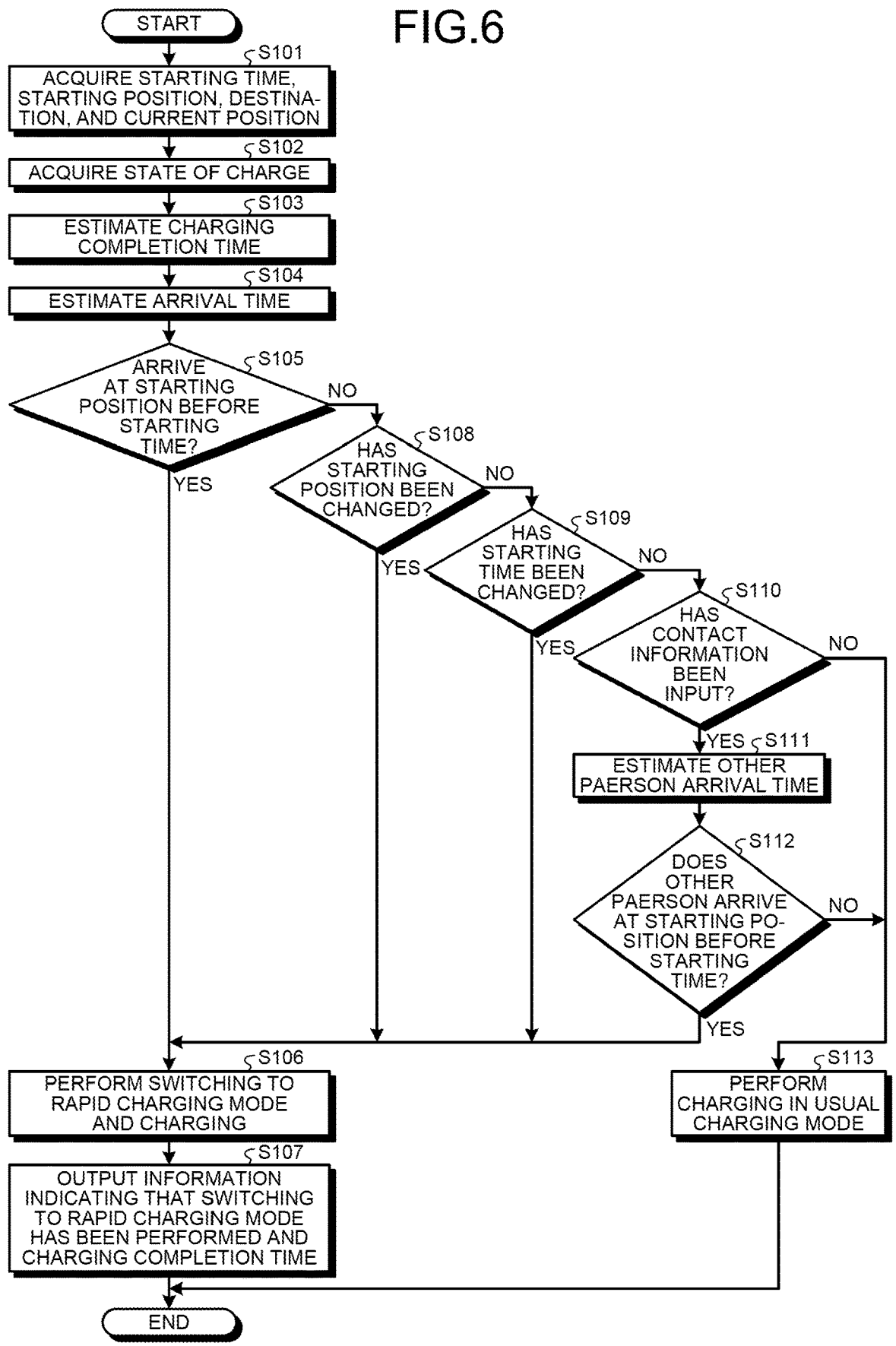
FIG. 6 is a flowchart outlining processing executed by the server according to the first embodiment.

Next, processing executed by the server 40 will be described. FIG. 6 is a flowchart outlining processing executed by the server 40.

As illustrated in FIG. 6, first, the estimator 471 acquires a starting time when a user uses the moving object 10, a starting position of the moving object 10, a destination of the user, and the current position of the user (Step S101). Specifically, the estimator 471 acquires the starting time, the starting position, and the destination of the moving object 10 input by the user operating the communication terminal 20 via the communicator 41 and the communication terminal 20. Moreover, the estimator 471 acquires the position information acquired by the position acquisition unit 25 of the communication terminal 20 as the current position of the user via the communicator 41 and the communication terminal 20. Note that the estimator 471 may acquire the starting time, the starting position, and the destination of the moving object 10 by acquiring schedule information associated with a terminal ID of the communication terminal 20 of the user from the schedule information DB 46.

Subsequently, the estimator 471 acquires the state of charge of the battery 11 of the moving object 10 scheduled to be used by the user via the communicator 41 (Step S102).

Thereafter, the estimator 471 estimates the charging completion time of the moving object 10 scheduled to be used by the user (Step S103). Specifically, the estimator 471 estimates the charging completion time of the moving object 10 based on the state of charge of the battery 11 of the moving object 10 and the distance from the starting position of the user to the destination.

Subsequently, the estimator 471 estimates an arrival time from the current position of the user to the starting position (Step S104). Specifically, the estimator 471 estimates the arrival time from the current position of the user to the starting position by dividing the distance from the current position of the user to the starting position by a predetermined speed (e.g., 80 m/min).

Thereafter, the determination unit 472 determines whether or not the user arrives at the starting position before the starting time based on the arrival time and the current position of the user (Step S105). In the case, the user may arrive at the starting position before the starting time, and the moving object 10 has been preferably charged. For that reason, the determination unit 472 determines whether or not the distance between the current position of the user and the starting position is shortened. The current position of the user is based on the position information acquired by the position acquisition unit 25 of the communication terminal 20 owned by the user. When the determination unit 472 determines that the user arrives at the starting position before the starting time (Step S105: Yes), the server 40 proceeds to Step S106 described later. In contrast, when the determination unit 472 determines that the user does not arrive at the starting position before the starting time (Step S105: No), the server 40 proceeds to Step S108 described later.

In Step S106, the charging controller 473 controls the charging device 30 such that the charging mode of charging the moving object 10 with the charging device 30 is switched to the rapid charging mode and the charging is performed via the communicator 41. Specifically, the charging controller 473 controls the controller 35 of the charging device 30 via the communicator 41 to switch the charging mode from the usual charging mode performed by the first power transmitter 31 to the rapid charging mode performed by the second power transmitter 32. As a result, the moving object 10 may perform charging to satisfy a required power amount even when the starting time of the user is made earlier.

Figure 7:
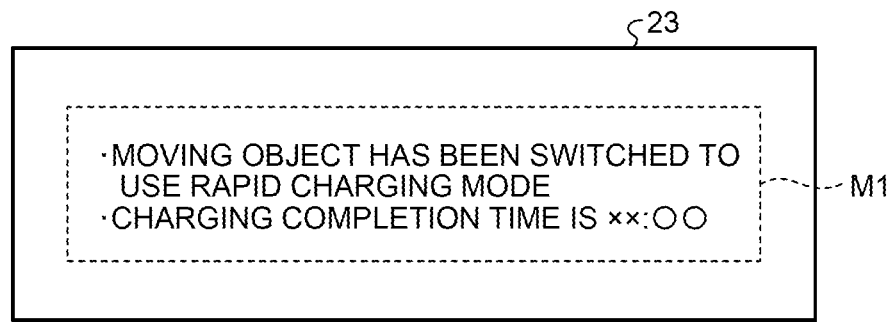
FIG. 7 illustrates one example of an image displayed by the communication terminal according to the first embodiment.

Subsequently, the display controller 474 outputs information indicating that the charging mode of charging the moving object 10 with the charging device 30 has been switched to the rapid charging mode and a charging completion time to the communication terminal 20 of the user (Step S107). Specifically, as illustrated in FIG. 7, the display controller 474 outputs information M1 indicating that the charging mode of charging the moving object 10 with the charging device 30 has been switched to the rapid charging mode and a charging completion time to the communication terminal 20 of the user. In the case, the communication terminal 20 causes the display 23 to display the information M1 indicating that the charging mode of charging the moving object 10 performed by the charging device 30 has been switched to the rapid charging mode and a charging completion time under the control of the controller 29. After Step S107, the server 40 ends the processing.

In Step S108, the determination unit 472 determines whether or not the user has changed the starting position of the moving object 10. Specifically, the determination unit 472 determines whether or not the user has changed the starting position based on an instruction signal for changing the starting position from the communication terminal 20 of the user via the communicator 41. In the case, the user changes the starting position by operating the operation unit 24 of the communication terminal 20. When the determination unit 472 determines that the user has changed the starting position (Step S100: Yes), the server 40 proceeds to Step S106. In contrast, when the determination unit 472 determines that the user has not changed the starting position (Step S108: No), the server 40 proceeds to Step S109 described later.

In Step S109, the determination unit 472 determines whether or not the user has changed the starting time of the moving object 10. Specifically, the determination unit 472 determines whether or not the user has changed the starting time based on an instruction signal for changing the starting time from the communication terminal 20 of the user via the communicator 41. In the case, the user changes the starting time by operating the operation unit 24 of the communication terminal 20. When the determination unit 472 determines that the user has changed the starting time of the moving object 10 (Step S109: Yes), the server 40 proceeds to Step S106. In contrast, when the determination unit 472 determines that the user has not changed the starting time of the moving object 10 (Step S109: No), the server 40 proceeds to Step S110 described later.

In Step S110, the determination unit 472 determines whether or not the contact information has been input from the other person associated with the user to the user. Specifically, the determination unit 472 determines whether or not the contact information has been input from the communication terminal 20 of the other person associated with the user to the communication terminal 20 of the user. For example, when the controller 29 of the communication terminal 20 of the user acquires information indicating that the contact information has been input from the communication terminal 20 of the other person from the communication terminal 20 of the user, the determination unit 472 determines that the contact information has been input from the other person associated with the user to the user. In contrast, when the controller 29 of the communication terminal 20 of the user may not acquire information indicating that the contact information has been input from the communication terminal 20 of the other person from the communication terminal 20 of the user, the determination unit 472 determines that the contact information has not been input from the other person associated with the user to the user. When the determination unit 472 determines that the contact information has been input from the other person associated with the user to the user (Step S110: Yes), the server 40 proceeds to Step S111. In contrast, when the determination unit 472 determines that the contact information has not been input from the other person associated with the user to the user (Step S110: No), the server 40 proceeds to Step S113 described later.

In Step S111, the estimator 471 estimates an other person arrival time when the other person arrives at the starting position of the moving object 10. Specifically, the estimator 471 estimates the other person arrival time when the other person arrives at the starting position of the moving object 10 based on at least one of message data and voice data included in contact information input from the communication terminal 20 of the other person in Step S110 to the communication terminal 20 of the user. For example, the estimator 471 estimates the current position of the other person based on the time, content, position, and the like described in the message data included in the contact information, and estimates the other person arrival time when the other person arrives at the starting position based on the estimation result and the starting position.

Subsequently, the determination unit 472 determines whether or not the other person arrives at the starting position before the starting time based on the arrival time, when the other person arrives at the starting position, estimated by the estimator 471 (Step S112). When the determination unit 472 determines that the other person arrives at the starting position before the starting time (Step S112: Yes), the server 40 proceeds to Step S106. In contrast, when the determination unit 472 determines that the other person does not arrive at the starting position before the starting time (Step S112: No), the server 40 proceeds to Step S113 described later.

In Step S113, the charging controller 473 controls the charging device 30 such that the charging mode of charging the moving object 10 with the charging device 30 is switched to the usual charging mode and the charging is performed via the communicator 41. Specifically, the charging controller 473 controls of charging the moving object 10 by the usual charging mode performed by the first power transmitter 31 by controlling the controller 35 of the charging device 30 via the communicator 41. As a result, the moving object 10 may perform charging to satisfy a required power amount by the starting time of the user. After Step S113, the server 40 ends the processing.

According to the above-described first embodiment, the estimator 471 acquires the starting time when the moving object 10 starts to be used, and estimates the charging completion time by which a required amount of power is charged to the moving object 10. Then, the determination unit 472 determines whether or not the charging of the moving object 10 has been completed by the starting time of the user based on the starting time and the charging completion time. Thereafter, when the determination unit 472 determines that the charging of the moving object 10 has not been completed by the starting time of the user, the charging controller 473 switches the charging mode of charging the moving object 10 with the charging device 30 from the usual charging mode to the rapid charging mode. As a result, charging may be performed by the starting time when the user uses the moving object 10.

Furthermore, according to the first embodiment, the estimator 471 acquires the starting position of the user, where the moving object 10 starts to be used, and the current position of the user, and estimates an arrival time period taken from the current position to the starting position based on the acquired starting position of the user and the current position of the user. Then, the determination unit 472 determines whether or not the user arrives at the starting position before the starting time based on the starting time of the user and the arrival time of the user. Thereafter, when the determination unit 472 determines that the user arrives at the starting position before the starting time, the charging controller 473 switches the charging mode performed by the charging device 30 to the rapid charging mode. As a result, the moving object 10 may be reliably charged before the user arrives at the starting position.

Furthermore, according to the first embodiment, when contact information including at least one of a message and voice data from the other person associated with the user is input, the estimator 471 estimates an other person arrival time period for the other person to arrive at the starting position based on the starting position of the user and contact information of the other person. Then, the determination unit 472 determines whether or not the other person arrives at the starting position before the starting time based on the starting time of the user and the other person arrival time period when the other person arrives at the starting position. Thereafter, when the determination unit 472 determines that the other person arrives at the starting position before the starting time, the charging controller 473 switches the charging mode performed by the charging device 30 to the rapid charging mode. As a result, the moving object 10 may be reliably charged before the other person arrives at the starting position.

Furthermore, according to the first embodiment, when acquiring the change of the starting position from the communication terminal 20, the charging controller 473 switches the charging mode performed by the charging device 30 to the rapid charging mode. As a result, even when the user changes the starting position, the moving object 10 may be reliably charged by the use star time when the user uses the moving object 10.

Furthermore, according to the first embodiment, when acquiring the change of the starting time from the communication terminal 20, the charging controller 473 switches the charging mode performed by the charging device 30 to the rapid charging mode. As a result, even when the user changes the starting time, the moving object 10 may be charged by the use star time when the user uses the moving object 10.

Furthermore, according to the first embodiment, the estimator 471 estimates the charging completion time of the battery 11 of the moving object 10 based on the starting position of the user, the state of charge of the battery 11 of the moving object 10, and the destination of the user. Therefore, the charging completion time may be estimated with high accuracy.

Furthermore, according to the first embodiment, the display controller 474 outputs the charging completion time to the communication terminal 20 of the user. Therefore, the user may grasp the charging completion time of the moving object 10 scheduled to be used.

Note that, although, in the first embodiment, an example in which the charging device 30 is installed at a starting position designated by a user has been described, this is not a limitation. For example, the charging device 30 may be installed at a position designate by the user operating the communication terminal 20. In the case, the controller 47 of the server 40 may move the moving object 10 in accordance with the starting position (predetermined address) and the starting time designated by the user operating the communication terminal 20 by controlling the moving object 10 used by the user via a network. As a result, the starting position may be changed to a position desired by the user, convenience may be enhanced.

Next, a second embodiment will be described. A charging system according to the second embodiment has a functional configuration different from that of the charging device 30 of the charging system 1 according to the first embodiment. Specifically, in the first embodiment, the server 40 switches the charging mode of charging the moving object 10 with the charging device 30 based on the starting time of the user and a charging time, whereas, in the second embodiment, the charging device switches the charging mode of charging the moving object 10 based on the starting time of the user and the charging time. Hereinafter, the functional configuration of a charging device according to the second embodiment will be described.

Figure 8:
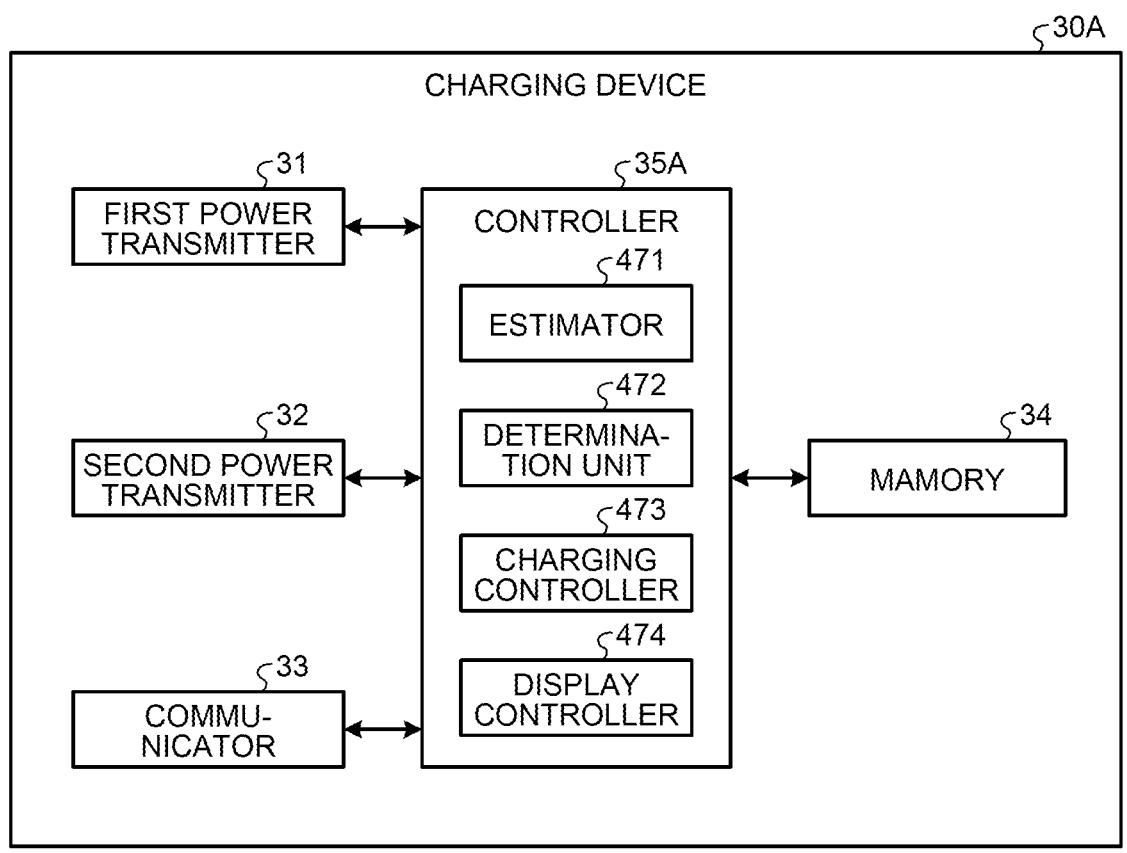
FIG. 8 is a block diagram illustrating the functional configuration of a charging device according to a second embodiment.

FIG. 8 is a block diagram illustrating the functional configuration of the charging device according to the second embodiment. A charging device 30A in FIG. 8 includes a controller 35A instead of the controller 35 of the charging device 30 according to the first embodiment.

The controller 35A includes the estimator 471, the determination unit 472, the display controller 474, and the charging controller 473 of the controller 47 provided in the server 40 according to the first embodiment. Note that, in the second embodiment, the controller 35A functions as a processor.

The charging device 30A configured as described above performs processing similar to processing executed by the server 40 described in the first embodiment. In the case, in the charging device 30A, the estimator 471 communicates with the communication terminal 20 via the communicator 33, acquires the starting time when the moving object 10 starts to be used, and estimates the charging completion time by which a required amount of power is charged to the moving object 10. Then, the determination unit 472 determines whether or not the charging of the moving object 10 has been completed by the starting time of the user based on the starting time and the charging completion time. Thereafter, when the determination unit 472 determines that the charging of the moving object 10 has not been completed by the starting time of the user, the charging controller 473 switches the charging mode of charging the moving object 10 from the usual charging mode to the rapid charging mode.

According to the above-described second embodiment, similarly to the first embodiment, charging may be performed by the starting time when the user uses the moving object 10.

Furthermore, in the charging systems according to the first and second embodiments, a "unit" may be replaced with a "circuit" or the like. For example, a controller may be replaced with a control circuit.

Furthermore, a program to be executed by the charging systems according to the first and second embodiments may be provided after being stored in a computer-readable recording medium such as a CD-ROM, a flexible disk (FD), a CD-R, a digital versatile disk (DVD), a USB medium, and a flash memory as file data in an installable format or an executable format.

Furthermore, the program to be executed by the charging systems according to the first and second embodiments may be provided by being stored in a computer connected to a network such as the Internet and downloaded via the network.

Note that, although, in the description of the flowcharts in the present specification, the context of processing between steps is clearly indicated by using expressions such as "first", "thereafter", and "subsequently", the order of processing necessary for implementing the embodiment is not uniquely determined by these expressions. That is, the order of processing in the flowcharts described in the present specification may be changed within a consistent range.

According to the present disclosure, an effect of allowing charging by a starting time when a user uses a moving object is exhibited.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server comprising
a processor configured to:
   acquire a starting time representing a time when a user starts to use a moving object including a rechargeable secondary battery;
   estimate a charging completion time by which a required amount of power is charged to the moving object;
   determine whether or not charging of the moving object is completed by the starting time based on the starting time and the charging completion time;
   acquire a starting position where the user starts to use the moving object;
   estimate an other person arrival time period for another person associated with the user to arrive at the starting position based on the starting position and contact information in a case where the contact information including at least one of a message and voice data from the other person is input;
   determine whether or not the other person arrives at the starting position before the starting time based on the starting time and the other person arrival period; and
   switch a charging mode of charging the moving object performed by a charging device from a usual charging mode to a rapid charging mode in a case where the other person arrives at the starting position before the starting time.

2. The server according to claim 1, wherein the processor is configured to perform the switching to the rapid charging mode in a case where change of the starting position is acquired.

3. The server according to claim 1, wherein the processor is configured to perform the switching to the rapid charging mode in a case where change of the starting time is acquired.

4. The server according to claim 1, wherein the processor is configured to:
   acquire a state of charge of the secondary battery and a destination of the user; and
   estimate the charging completion time based on the starting position, the state of charge, and the destination.

5. The server according to claim 1, wherein the processor is configured to output the charging completion time to a communication terminal of the user.

6. A charging system comprising:
a moving object including a rechargeable secondary battery; and
a server including a processor configured to
   acquire a starting time representing a time when a user starts to use the moving object;
   estimate a charging completion time by which a required amount of power is charged to the moving object;
   determine whether or not charging of the moving object is completed by the starting time based on the starting time and the charging completion time;

acquire a starting position where the user starts to use the moving object;

estimate an other person arrival time period for another person associated with the user to arrive at the starting position based on the starting position and contact information in a case where the contact information including at least one of a message and voice data from the other person is input;

determine whether or not the other person arrives at the starting position before the starting time based on the starting time and the other person arrival time period; and switch a charging mode of charging the moving object performed by a charging device from a usual charging mode to a rapid charging mode in a case where the other person arrives at the starting position before the starting time.

7. The charging system according to claim 6, wherein the processor is configured to perform the switching to the rapid charging mode in a case where change of the starting position is acquired.

8. The charging system according to claim 6, wherein the processor is configured to perform the switching to the rapid charging mode in a case where change of the starting time is acquired.

9. The charging system according to claim 6, wherein the processor is configured to:

acquire a state of charge of the secondary battery and a destination of the user; and estimate the charging completion time based on the starting position, the state of charge, and the destination.

10. The charging system according to claim 6, wherein the processor is configured to output the charging completion time to a communication terminal of the user.

11. A non-transitory computer-readable recording medium on which an executable program is recorded, the program causing a processor of a computer to execute:

acquiring a starting time representing a time when a user starts to use a moving object including a rechargeable secondary battery;

estimating a charging completion time by which a required amount of power is charged to the moving object;

determining whether or not charging of the moving object is completed by the starting time based on the starting time and the charging completion time;

acquiring a starting position where the user starts to use the moving object;

estimating an other person arrival time period for another person associated with the user to arrive at the starting position based on the starting position and contact information in a case where the contact information including at least one of a message and voice data from the other person is input;

determining whether or not the other person arrives at the starting position before the starting time based on the starting time and the other person arrival time period; and switching a charging mode of charging the moving object performed by a charging device from a usual charging mode to a rapid charging mode in a case where the other person arrives at the starting position before the starting time.

12. The non-transitory computer-readable recording medium according to claim 11, wherein the program causes the processor to execute performing the switching to the rapid charging mode in a case where change of the starting position is acquired.

13. The non-transitory computer-readable recording medium according to claim 11, wherein the program causes the processor to execute performing the switching to the rapid charging mode in a case where change of the starting time is acquired.

14. The non-transitory computer-readable recording medium according to claim 11, wherein the program causes the processor to execute:

acquiring a state of charge of the secondary battery and a destination of the user; and estimating the charging completion time based on the starting position, the state of charge, and the destination.

\* \* \* \* \*